June 13, 1950　　　　M. FERNÁNDEZ　　　　2,511,252
INDEPENDENT WHEEL SUSPENSION
Filed Jan. 17, 1945　　　　　　　　　　　6 Sheets-Sheet 4

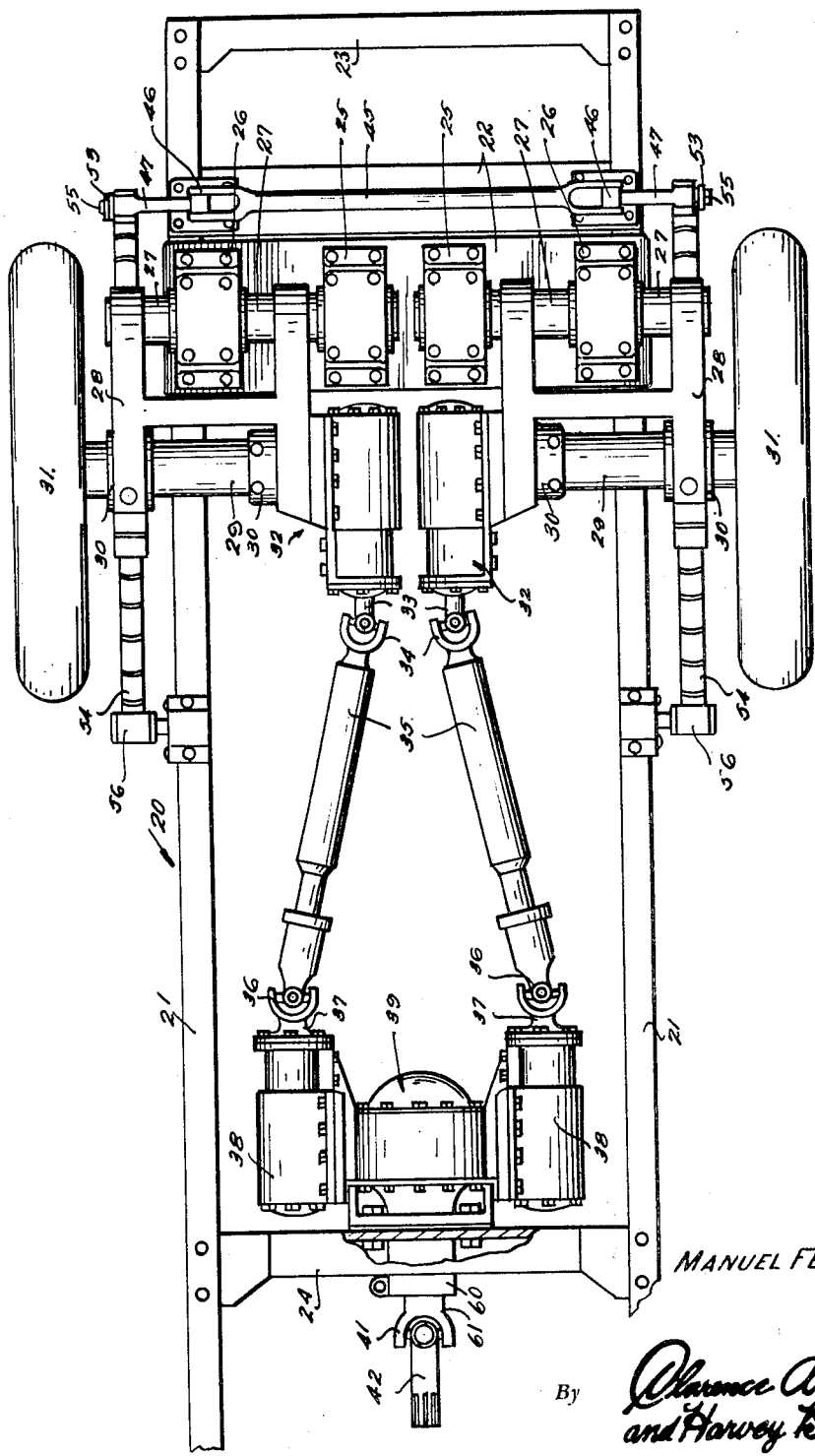

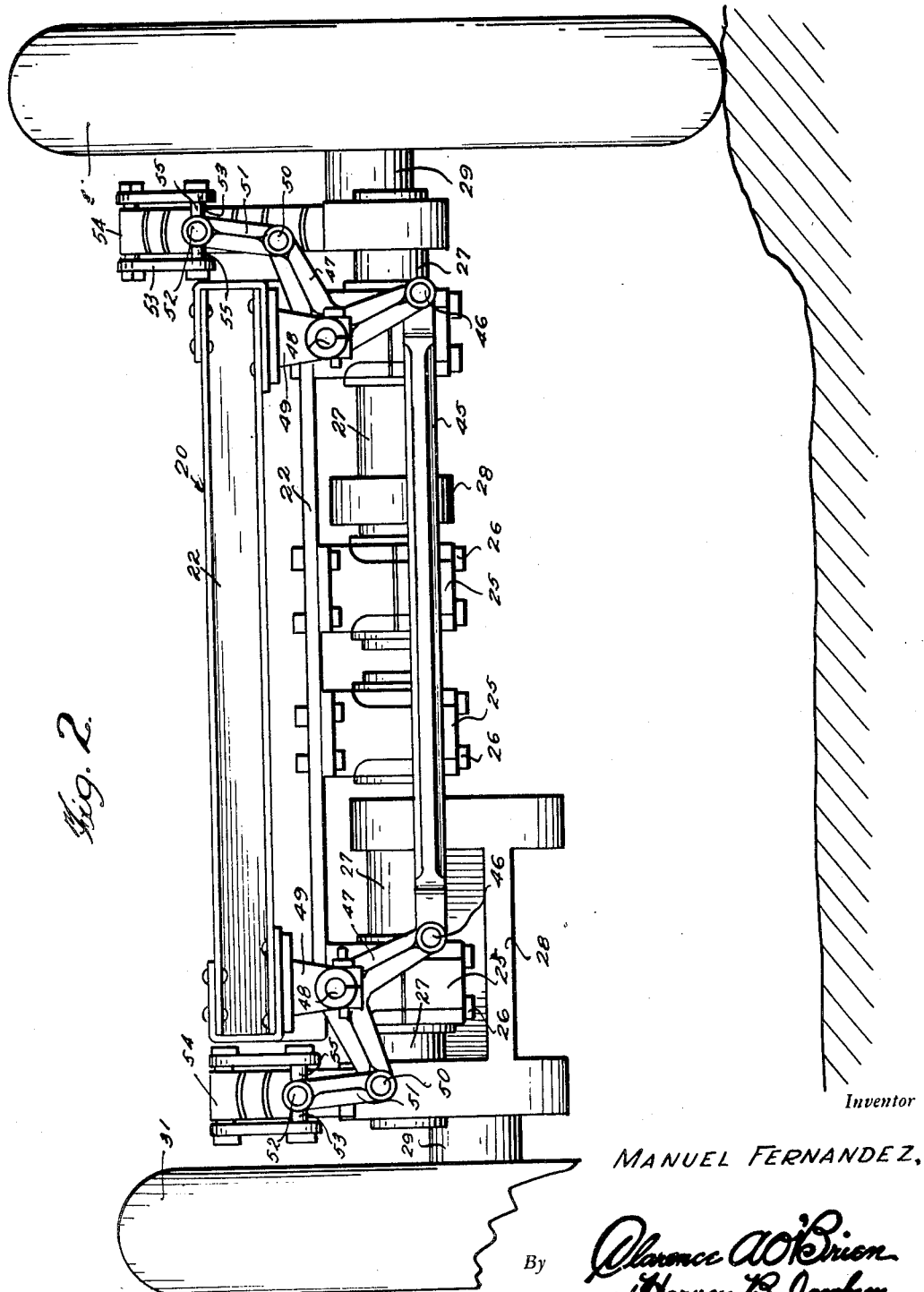

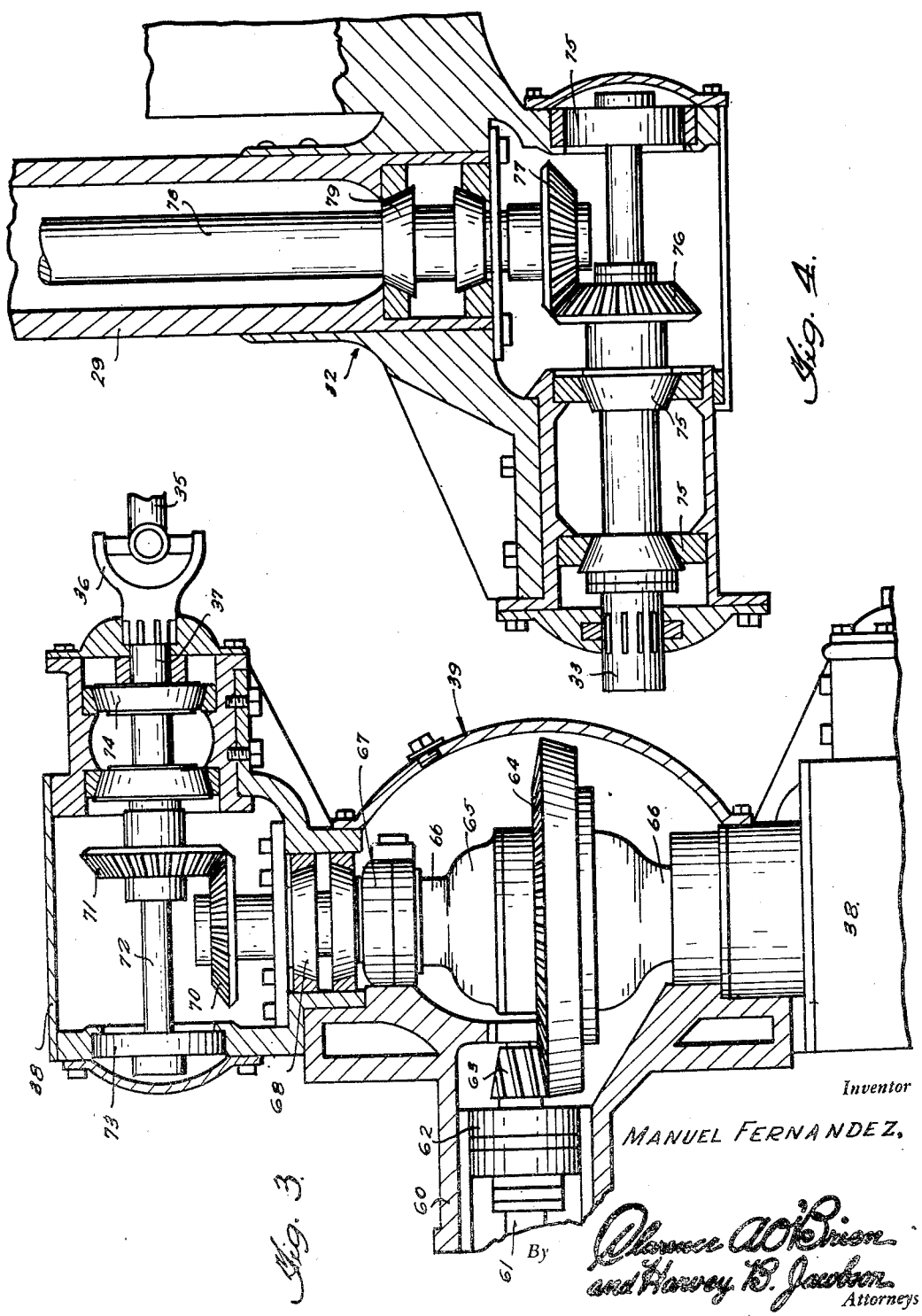

Inventor
MANUEL FERNANDEZ,
By Clarence A. O'Brien
and Harvey B. Jacobson
Attorneys June 13, 1950 M. FERNÀNDEZ 2,511,252
INDEPENDENT WHEEL SUSPENSION
Filed Jan. 17, 1945 6 Sheets-Sheet 5
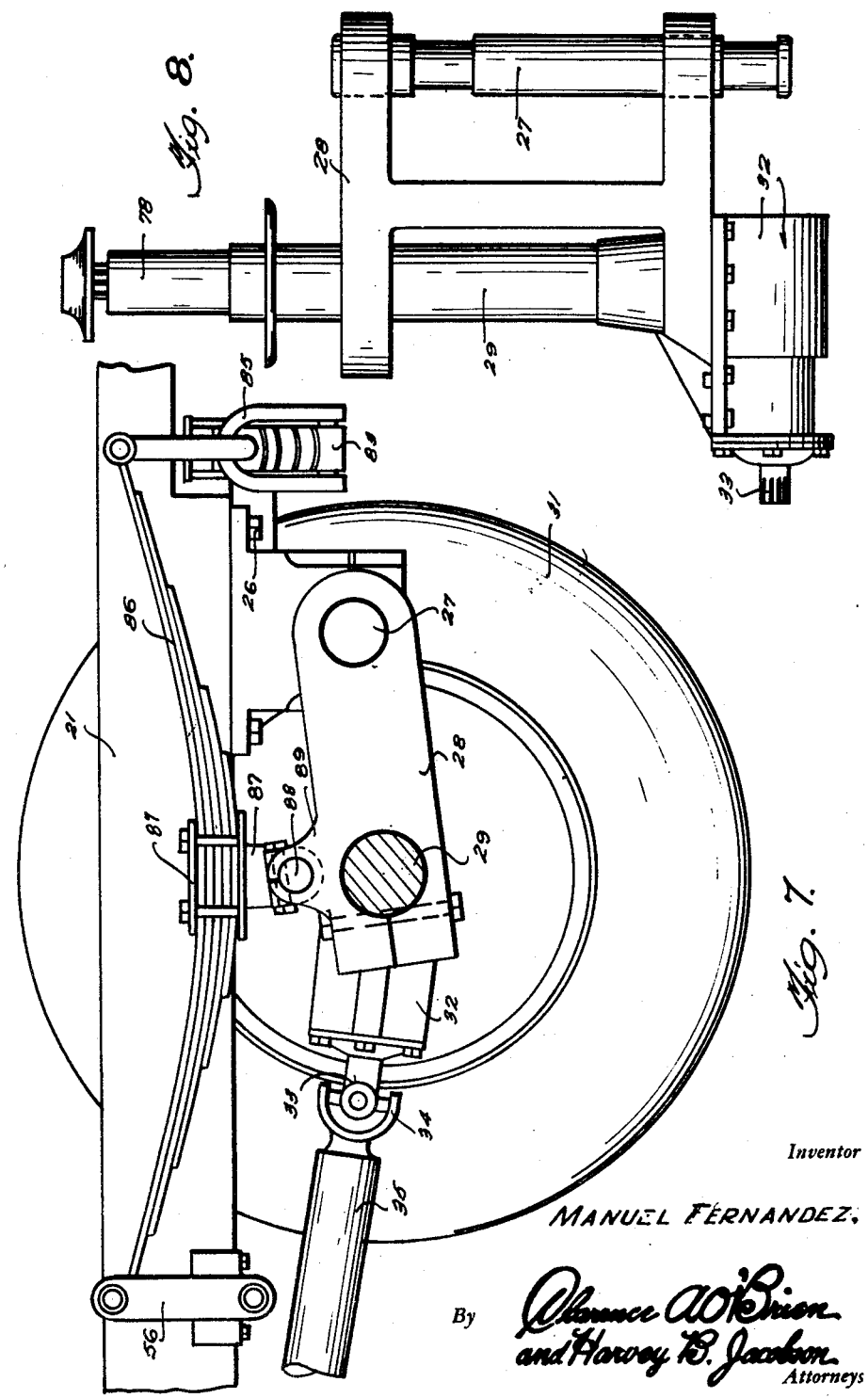
Inventor
MANUEL FERNANDEZ.
By Clarence A. O'Brien
and Harvey B. Jackson
Attorneys Patented June 13, 1950

2,511,252

UNITED STATES PATENT OFFICE 2,511,252

INDEPENDENT WHEEL SUSPENSION

Manuel Fernández, Cienfuegos, Cuba

Application January 17, 1945, Serial No. 573,205

16 Claims. (Cl. 180—22)

This invention relates to independent wheel suspension, and more particularly to such a wheel suspension as applied to motor vehicles.

A primary object of this invention is the provision of an independent wheel suspension adapted for power-driven vehicles, wherein the driving wheels may be suspended on independent axles.

An additional object of this invention is the provision of an improved transmission and differential mechanism in association with said independently suspended driving wheels, whereby power may be transmitted to each wheel independently of the other, in such manner that the position of the independent axles relative to the transverse axis of the vehicle, or the level upon which each independent wheel is moving, may be varied without affecting the transmission of power to the driving wheels.

A still further object of the invention is the provision of an improved wheel system adapted to be applied to multiple-wheeled vehicles, the arrangement being such that the driven wheels and supplemental supporting wheels adjacent thereto may be independently suspended for variable positioning in accordance with the ground level over which each wheel is traveling, without disruption of the power transmission to the driving wheels.

A further and more specific object of the invention is the provision of an improved type transverse stabilizer adapted to be utilized in conjunction with independently mounted power-driven wheels.

A still further object resides in the provision of an independent wheel suspension applicable to the power-driven wheels of a vehicle, of sufficient strength to maintain the wheels in alignment when subjected to driving and braking torque.

Still another object is the provision of an improved type of rear or driving wheel suspension, constructed in accordance with the foregoing objects, adapted through the independent suspension to preclude misalignment and shifting of the chassis and wheels, reduce wear on the chassis and the tires, and produce a more efficient and effective drive over irregular terrain.

Still another object is the provision of such a wheel suspension arrangement which will be sturdy and durable in construction, reliable and efficient in operation, and comparatively simple and inexpensive to manufacture and assemble.

Other objects reside in the combinations of elements, arrangements of parts, and features of construction, all as will be more fully pointed out hereinafter and disclosed in the accompanying drawings, wherein there are disclosed preferred embodiments of this inventive concept.

In the drawings:

Figure 1 is a bottom plan view of one form of this inventive concept as applied to the rear wheels of a motor vehicle.

Figure 2 is an enlarged rear elevational view of the construction shown in Figure 1.

Figure 3 is an enlarged horizontal view taken substantially along the mid-section of the differential mechanism of the construction shown in Figures 1 and 2.

Figure 4 is an enlarged horizontal sectional view taken substantially along the median line of the transmission mechanism.

Figure 7 is an enlarged sectional view taken substantially along the line 7—7 of Figure 5, as viewed in the direction indicated by the arrows.

Figure 8 is a bottom plan view of a constructional detail.

Similar reference characters refer to similar parts throughout the several views of the drawings.

Figure 6:
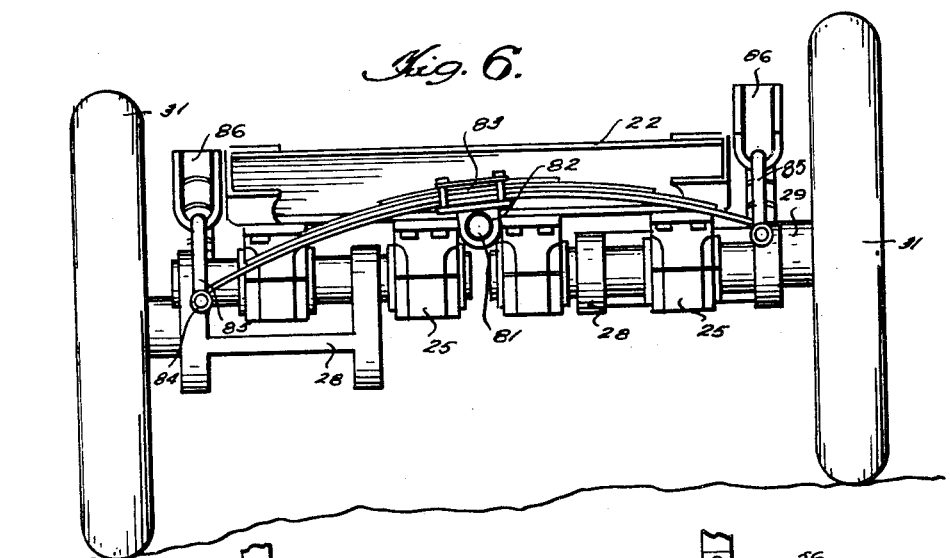
Figure 6 is a rear elevational view of the construction shown in Figure 5.

Having reference now to the construction shown in Figures 1 and 2, there is generally indicated at 20 a vehicle frame including two longitudinally extending supporting members 21 and a transverse supporting and reinforcing member 22. A rear transverse member 23 extends between the extremities of the members 21 and an intermediate member 24 correspondingly extends at a spaced distance forwardly from the member 22. The frame 20 is adapted is support a vehicle body and motor of any desired conventional type (not shown). The transverse member 22 has a plurality, illustratively four, of reinforcing and axle-supporting brackets 25 secured thereto, as by means of bolts 26.

Positioned between opposite pairs of brackets 25 are stub axles 27 pivotally secured therein.

Stub axles 27 are passed through suitable apertures in the extremities of H-shaped axle-supporting brackets 28, one leg of each H being passed between outer and inner brackets on opposite sides, and the other leg being positioned exteriorly of the outermost bracket, suitable retaining collars or the like being provided for maintaining the parts in related assembly. The opposite legs of the H-shaped brackets 28 each support a wheel-supporting axle 29, suitably journaled in bearings 30, and having mounted on its outer extremity a driving wheel 31. The inner ends of each of axles 29 have secured thereto transmission housings 32, from which extend drive shafts 33 connected by universal joints 34 to extensible main drive shafts 35, which in turn extend to universal joints 36. Each of universal joints 36 is secured to a shaft 37, which extends into a gear housing 38, the two housings 38 being secured on opposite sides of a main differential housing generally indicated at 39. Housing 39 is supported by transverse support members 24 and is driven from a universal joint 41 which in turn is adapted to be rotated by a drive shaft 42 extending to a motor or any other desired source of power.

Referring back to Figure 2, particularly, a transverse stabilizer bar 45 has its opposite extremities pivotally secured, as by pivots 46, to the arms of bell crank levers 47 pivotally secured, as by pivots 48, in brackets 49 mounted on the under side of transverse supporting member 22. The opposite extremities of the bell crank members are pivotally secured, as by pivots 50, to links 51 pivotally secured, as by pivots 52, to spring shackles 53. The spring shackles 53 are in turn secured to leaf springs 54, as by pins 55, and the opposite ends of the springs 54 are secured in spring-supporting members 56 secured to the longitudinal frame members.

Referring back now to the differential mechanism 39, and particularly to Figure 3, it will be seen that the main differential housing 39 includes a sleeve 60 through which extends a shaft 61 connected to the universal joint 41 which is journaled in suitable bearings 62 and has at its extremity a bevel gear 63. The bevel gear 63 in turn drives the ring bevel gear 64 associated with a conventional differential mechanism 65, from opposite extremities of which extend stub axles 66 extending through suitable supporting collars 67 and bearings 68 to terminate in the housings 38 positioned at opposite sides of the main differential housing 39. The outer extremity of the stub shaft 66 carries a bevel gear 70 adapted to engage with a corresponding bevel gear 71 mounted on axles 72 journaled in suitable bearings 73 and 74 and extending longitudinally through the housing 38. The shaft 72 terminates in the extending portion 37 comprising a part of the universal joint 36 which in turn drives the drive shaft 35.

As previously pointed out, each of the drive shafts 35 connects with the universal joint 34 which is in turn associated with a shaft 33 of the transmission mechanism 32. Each of transmission mechanisms 32 includes an L-shaped housing, through the longitudinal portion of which extends the drive shaft 33, suitable bearings 75 being provided for journaling the same, and a bevel gear 76 being mounted on an intermediate portion thereof, adapted to engage a corresponding bevel gear 77 secured to an axle shaft 78 journaled in suitable bearings 79 and extending through the axle housing 29 to rotate an associated wheel 31.

Now, from the foregoing, it will be seen that power from the motor or the like is transmitted through the shaft 42, the differential 39 and the gearing in housing 38, the universal joint 36, the drive shaft 35, the universal joint 34, and the shaft 33 and axle 78, to the wheels 31, and that such driving power is unaffected by the relative horizontal position of the wheels 31 with respect to each other. It will also be seen that each of the wheels 31 may pivot vertically independently of the other, by virtue of the mounting of the H-shaped brackets 28 on the stub axles 27, and that correspondingly the leaf springs 54 will tend to return the wheels to their original position, as well as absorb any undue shock transmitted to the vehicle thereby. It will additionally be seen that the transverse stabilizer member 45 serves to maintain the wheels in continuous alignment, and prevent distortion or misalignment thereof regardless of irregularities in the road bed or other terrain over which the vehicle is traveling.

Suitable brake mechanism is of course provided, taking the form of conventional brake drums and associated operating mechanism, but such mechanism, comprising no part of the instant invention save in its association with the other elements described, is not shown.

Figure 5:
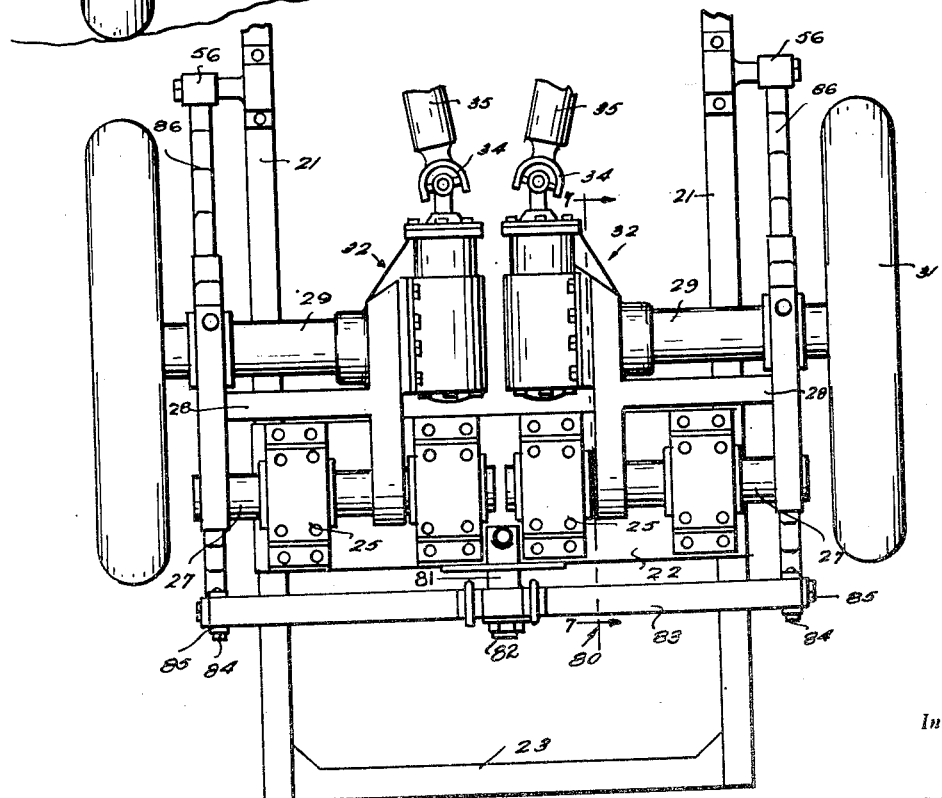
Figure 5 is a bottom plan view of a modified form of construction.

Having particular reference now to Figures 5 and 6, there is disclosed a modified form of transverse stabilizer generally indicated at 80. In describing this modification, those parts identical with the parts previously described will be designated by identical reference characters, only those parts distinguishing over the previously described construction being identified by new reference numerals.

Secured to the rear extremity of the transverse support 22 is an extending lug or pivot 81 adapted to engage a suitable aperture in a depending lug 82 carried by a transversely disposed leaf spring 83. The extremities of the leaf spring 83 are connected, as by sleeves 84, to spring shackles 85 secured to the extremities of leaf springs 86, the leaf springs 86 being, with the exception of the shackles 85, identical to the leaf springs 54. As best shown in Figure 7, the mid-portion of the spring 86 may be secured by a suitable shoulder, clip and bearing bracket or lugs 87 to a pin 88 engaged in an aperture in a lug 89 comprising an integral part of the H-shaped brackets 28. A similar construction may be utilized in the modification previously described in connection with Figures 1 and 2. In the instant modification it will be seen that the resilient leaf spring 83 takes the place of and functions in the same manner as the transverse stabilizer bar 45, bell cranks 47 and links 51 previously described, but with the added resiliency of the spring 83, the drive and independent suspension of the wheels being accomplished in an identical manner to that of the previously described modification.

Figure 9:
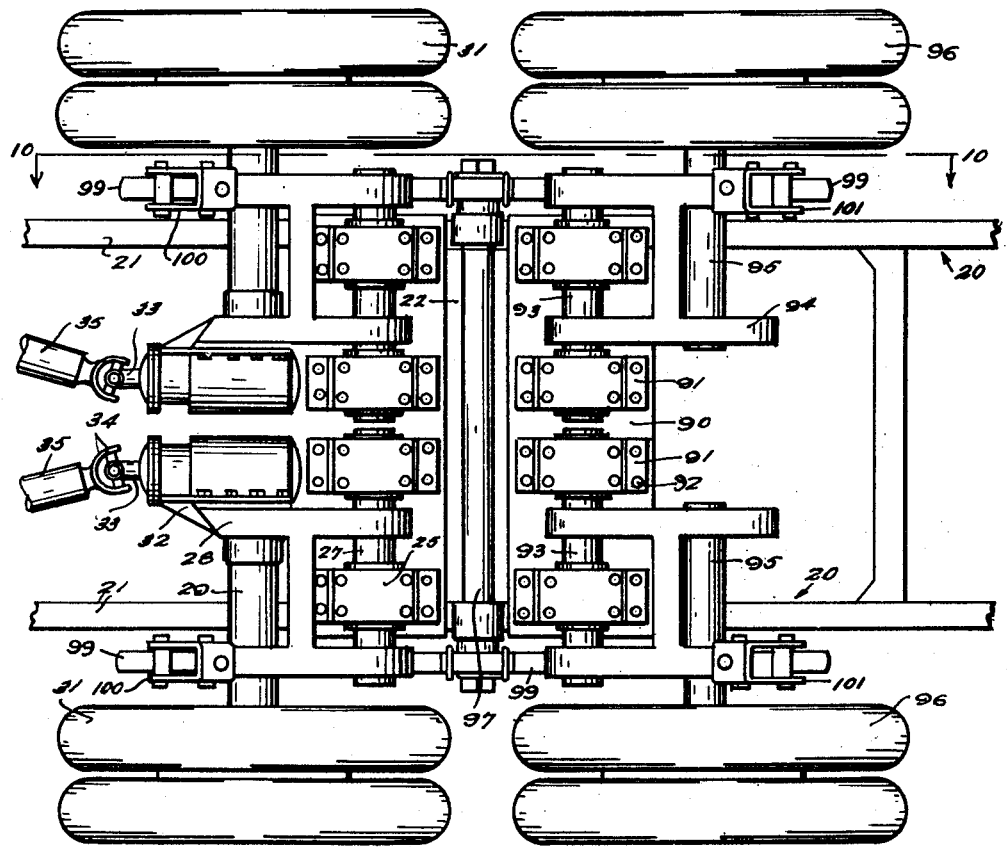
Figure 9 is a fragmentary bottom plan view of a modified form of construction as applied to a multi-wheeled vehicle.
Figure 10:
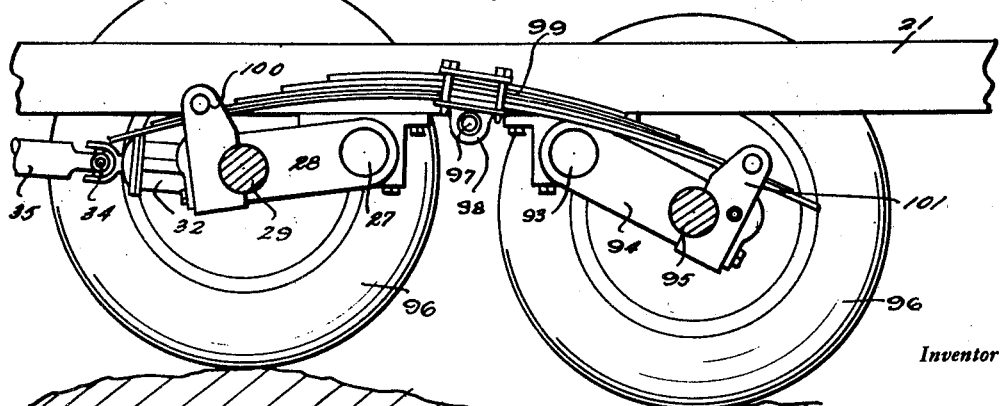
Figure 10 is a sectional view taken substantially along the line 10—10 of Figure 9.

Having reference now to the modification shown in Figures 9 and 10, there is disclosed a heavy duty, multiple-drive vehicle. Here, as in the foregoing modification, those parts identical with previously described portions of the mechanism will be described by similar reference characters. In this modification the frame 20 supports a transverse reinforcing member 22 between longitudinally extending frame members 21, which member 22 supports a plurality of brackets 25, opposite pairs of which carry separate stub axles 27 on which in turn are mounted H-shaped brackets 28, the opposite legs of which support driving axle housings 29, mounted on the extremities of which are a plurality of wheels 31. The inner ends of the drive axles connect with transmission mechanisms 32 provided with drive shafts 33 connected to universal joints 34 driven by separate drive shafts 35 from a differential and suitable source of power. Mounted directly to the rear of the transverse member 22 is a second transverse supporting member 90 which has secured thereto a plurality of brackets 91, as by bolts 92, the brackets 91 being substantially identical to the brackets 25 and supporting stub axles 93 substantially identical to the stub axles 27. The axles 93 have secured thereto H-shaped brackets 94, the opposite legs of which serve as journals for divided axles 95 on the extremities of which are mounted a plurality of freely rotatable trailing wheels 96.

Positioned between the members 90 and 22 and secured to the transverse frame members 21 is a supporting axle 97.

Opposite extremities of the axle 97 engage in suitable apertures in lugs 98 secured to the central portions of leaf springs 99, the opposite extremities of which are secured to spring shackles 100 and 101, mounted respectively forwardly of axle 29 and rearwardly of axles 95, and fixedly secured to the H-shaped brackets 28 and 94, respectively.

From the foregoing it will now be seen that in the instant modification each of the pairs of wheels 31 and 96 may move in a vertical direction independently of either of the other three pairs of wheels, due to the independent suspension of each pair, and that correspondingly the roughest ground may be traversed with a minimum of strain on the frame 20 and the vehicle body supported thereby. In this modification, obviously only the wheels 31 comprise driven wheels, the wheels 96 serving as trailer wheels, effectively to equalize and distribute the load carried by the vehicle.

From the foregoing it will now be seen that there is herein provided an improved method of independent rear wheel or drive wheel suspension for motor vehicles accomplishing all the objects of this invention and many others including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In an independent wheel suspension for vehicles, the combination of a frame, supporting members thereon, stub axles carried by said supporting members, H-shaped brackets pivotally secured to said stub axles, drive axles pivotally secured to said brackets, spring connections between the brackets and the frame, wheels carried by said drive axles and independent drive means for each drive axle.

2. In an independent wheel suspension for vehicles, the combination of a frame, supporting members thereon, independent stub axles carried by said supporting members, brackets pivotally secured to each of said stub axles and each comprising side portions and a cross member intermediately connecting the same, the side portions at their outer ends being pivoted to the stub axles, drive axles pivotally secured to each of said brackets at the inner ends of the side portions, spring connections between the brackets and the frame, wheels carried at the extremities of each of said drive axles and a single drive member having independent driving connections with the inner ends of the drive axles for driving the same at the same speed.

3. In an independent wheel suspension for vehicles, the combination of a frame, supporting members thereon, independent stub axles carried by said supporting members, brackets having intermediate cross members and parallel branching arms extending in opposite directions, the arms at one end being pivotally secured to each of said stub axles, drive axles pivotally secured to the other branching arms of each of said brackets, spring connections between the brackets and the frame, wheels carried at the extremities of each of said drive axles, independent transmission means for each of said axles, and a common differential for driving said independent transmission means and having independent universal drive connections therewith.

4. In an independent wheel suspension for vehicles, the combination of a frame, supporting members thereon, independent stub axles carried by said supporting members, H-shaped brackets pivotally secured near one end to each of said stub axles, drive axles pivotally secured to each of said brackets near the opposite end thereof, differential drive means, independent extensible drive means for said differential means, gear means connecting said extensible drive means and the inner ends of said drive axles, wheels carried at the extremities of each of said drive axles, and spring suspension means for each of said drive axles connected to the corresponding bracket.

5. In an independent wheel suspension for vehicles, the combination of a frame, supporting members thereon, independent stub axles carried by said supporting members, substantially H-shaped brackets pivotally secured at one end of each to each of said stub axles, drive axles pivotally secured to the free ends of each of said brackets, wheels carried at the extremities of each of said drive axles, and spring suspension means for each of said drive axles, said spring suspension means comprising leaf springs extending longitudinally of the frame at the sides thereof secured at an intermediate point to said brackets and at an extremity to said frame and a connection between the opposite extremities extending transversely of the frame and supported thereon.

6. In an independent wheel suspension for vehicles, the combination of a frame, supporting members thereon, independent stub axles carried by said supporting members, brackets pivotally secured near one end to each of said stub axles and comprising parallel connected side portions rigid with each other, drive axles pivotally secured near its opposite end to each of said brackets, drive means for said axles, wheels carried at the extremities of each of said drive axles, and spring suspension means for each of said drive axles, said spring suspension means comprising leaf springs, each secured at an intermediate point to said brackets and at an extremity to said frame, the 7. In an independent wheel suspension for vehicles, the combination of a frame, supporting members thereon, independent stub axles carried by said supporting members, H-shaped brackets each having an intermediate cross member and oppositely branching arms, certain of said arms being pivotally secured to each of said stub axles, drive axles pivotally secured to the other arms of each of said brackets, wheels carried at the extremities of each of said drive axles, and spring suspension means for each of said drive axles, said spring suspension means comprising leaf springs secured at intermediate points to said brackets and at certain extremities to said frame, the opposite extremities of said springs being connected by a transverse stabilizer, said stabilizer comprising a leaf spring pivotally secured to said frame.

8. In an independent wheel suspension for vehicles, the combination of a frame, supporting members thereon, independent stub axles carried by said supporting members, brackets pivotally secured at one end to each of said stub axles, drive axles pivotally carried by the opposite end of each of said brackets, wheels carried at the extremities of each of said drive axles, and spring suspension means for each of said drive axles, said spring suspension means comprising leaf springs secured at intermediate points to said brackets and at certain ends to said frame, the opposite ends of said springs being connected by a transverse stabilizer supported on the frame, and independent transmission means for each of said axles.

9. In an independent wheel suspension for vehicles, the combination of a frame, supporting members thereon, independent stub axles carried by said supporting members, brackets pivotally mounted on the opposite ends of each of said stub axles, drive axles journaled in the other ends of each of said brackets, wheels carried at the extremities of each of said drive axles, spring suspension means for each of said drive axles, said spring suspension means comprising leaf springs secured at an intermediate point to said brackets and at an extremity to said frame, the opposite extremities of said springs being connected by a transverse stabilizer, said stabilizer comprising a leaf spring pivotally secured to said frame, independent transmission means at the inner end of each drive axle and a common differential mechanism for driving said independent transmission means and having independent connections therewith, said differential mechanism being suitably driven.

10. In an independent wheel suspension for vehicles, the combination of a frame, rows of supporting members thereon, independent stub axles carried by said supporting members at opposite sides of the frame, brackets pivotally secured at one end to each of said stub axles, front and rear wheel axles pivotally carried by the opposite ends of said brackets at opposite sides of the frame, wheels carried at the extremities of each of said latter axles, drive means for certain of said axles, pivotally suspended spring suspension means for each pair of said wheel axles, and a transverse connection between opposite spring suspension means mounted on the frame.

11. In an independent wheel suspension for vehicles, the combination of a frame, rows of supporting members thereon, independent stub axles carried by said supporting members at opposite sides of the frame, H-shaped brackets pivotally secured at one end to each of said stub axles, front and rear wheel axles pivotally carried by the opposite ends of said brackets at opposite sides of the frame, wheels carried at the extremities of each of said latter axles, drive means for certain of said axles, springs having the ends thereof connected to the brackets at the wheel axles, and means pivotally mounting said springs intermediate their ends on the frame.

12. In an independent wheel suspension for vehicles, the combination of a frame, rows of supporting members thereon, independent stub axles carried by said supporting members at opposite sides of the frames, H-shaped brackets pivotally secured at one end to each of said stub axles, wheel axles journaled in the opposite ends of said brackets at opposite sides of the frame, wheels carried at the extremities of each of said latter axles, drive means for certain of said wheel axles, spring suspension means for said wheel axles, said suspension means comprising springs mounted on the frame and pivotally connected to the brackets in spaced relation above the wheel axles.

13. In an independent wheel suspension for vehicles, the combination of a frame, supporting members thereon, independent stub axles carried by said supporting members at opposite sides of the frame, H-shaped brackets pivotally secured to each of said stub axles, wheel axles journaled in said brackets at opposite sides of the frame, wheels carried at the extremities of said wheel axles, drive means for said wheel axles, spring suspension means for said wheel axles and comprising springs pivotally mounted intermediately on the brackets and connected to the frame at one end of each, and an articulated stabilizer bar transversely and pivotally suspended from the frame and connected to the opposite ends of the springs.

14. In an independent wheel suspension for vehicles, the combination of a frame, rows of supporting members thereon, independent stub axles carried by said supporting members at opposite sides of the frame, brackets pivotally secured at one end to each of said stub axles, front and rear wheel axles pivotally carried by the opposite ends of said brackets at opposite sides of the frame, wheels carried at the extremities of each of said latter axles, drive means for certain of said axles, springs pivotally mounted intermediately on the frame and having the ends thereof connected to the brackets at the wheel axles, and links connecting the springs to the brackets.

15. In an independent wheel suspension for vehicles, the combination of a frame, rows of supporting members thereon, independent stub axles carried by said supporting members at opposite sides of the frame, brackets pivotally secured at one end to each of said stub axles, front and rear wheel axles pivotally carried by the opposite ends of said brackets at opposite sides of the frame, wheels carried at the extremities of each of said latter axles, drive means for certain of said wheel axles, spring suspension means for each pair of wheel axles, said suspension means each comprising a spring pivotally mounted intermediately on the frame and pivotally connected to the brackets above the wheel axles.

16. In an independent wheel suspension for vehicles, the combination of a frame, supporting members thereon, independent stub axles carried by said supporting members at opposite sides of the frame, brackets pivotally secured to each of said stub axles, wheel axles journaled in said brackets at opposite sides of the frame, wheels carried at the extremities of said wheel axles, drive means for said wheel axles, spring suspension means for said wheel axles comprising springs pivotally mounted intermediately on the brackets and connected to the frame at one end of each, and an articulated stabilizer bar transversely and pivotally suspended from the frame and connected to the opposite ends of the springs.

MANUEL FERNÁNDEZ.

REFERENCES CITED

The following references are of record in the file of this patent:

UNITED STATES PATENTS

| Number | Name | Date |
|---|---|---|
| 856,486 | Newman | June 11, 1907 |
| 995,155 | Koeb et al. | June 13, 1911 |
| 1,119,020 | Klenke | Dec. 1, 1914 |
| 1,591,750 | Dumont | July 6, 1926 |
| 1,708,511 | Lyford | Apr. 9, 1929 |
| 1,824,975 | Ahlm et al. | Sept. 29, 1931 |
| 2,069,399 | White | Feb. 2, 1937 |
| 2,085,662 | Johnson | June 29, 1937 |
| 2,110,819 | Poirier | Mar. 8, 1938 |